UNITED STATES PATENT OFFICE.

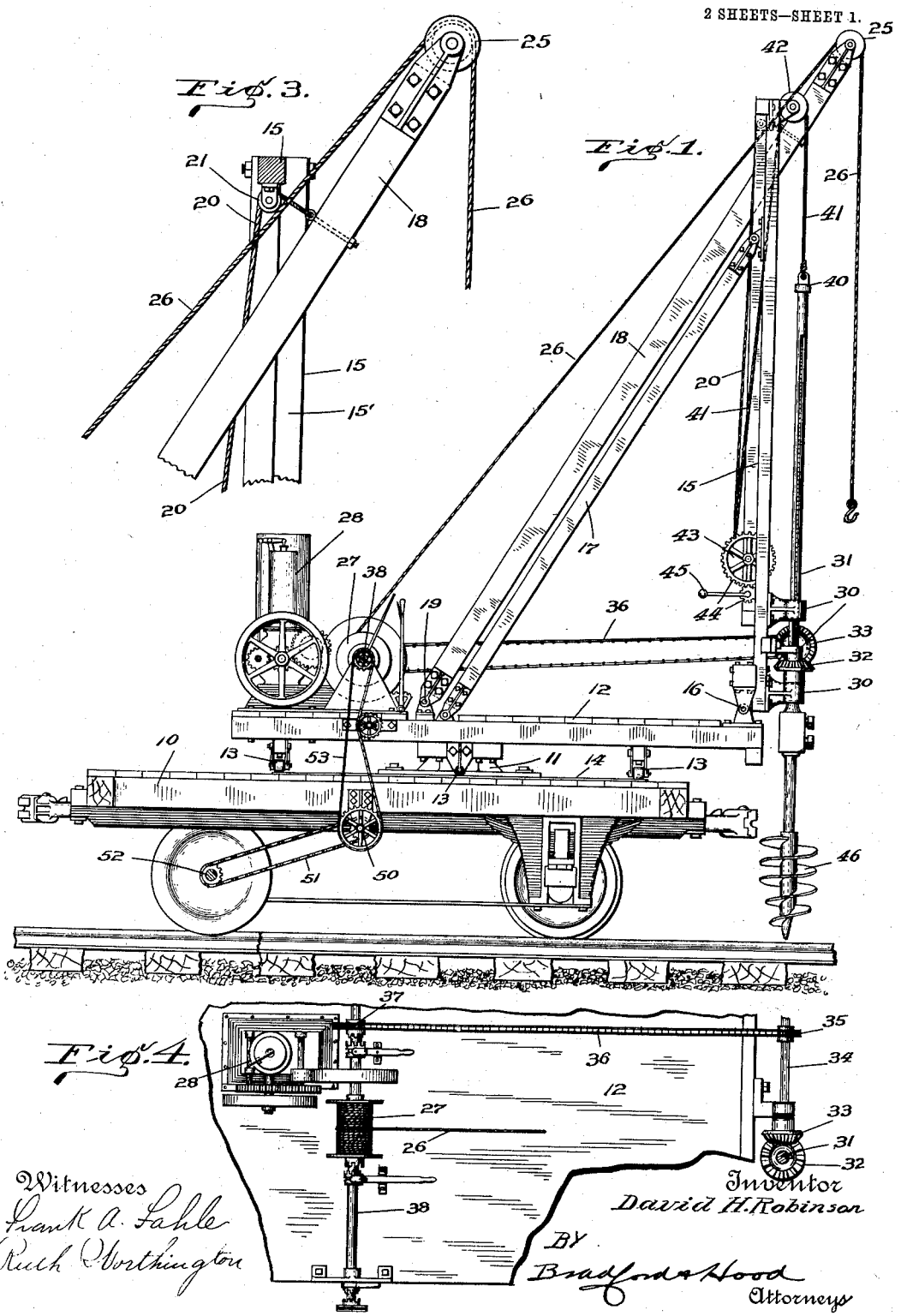

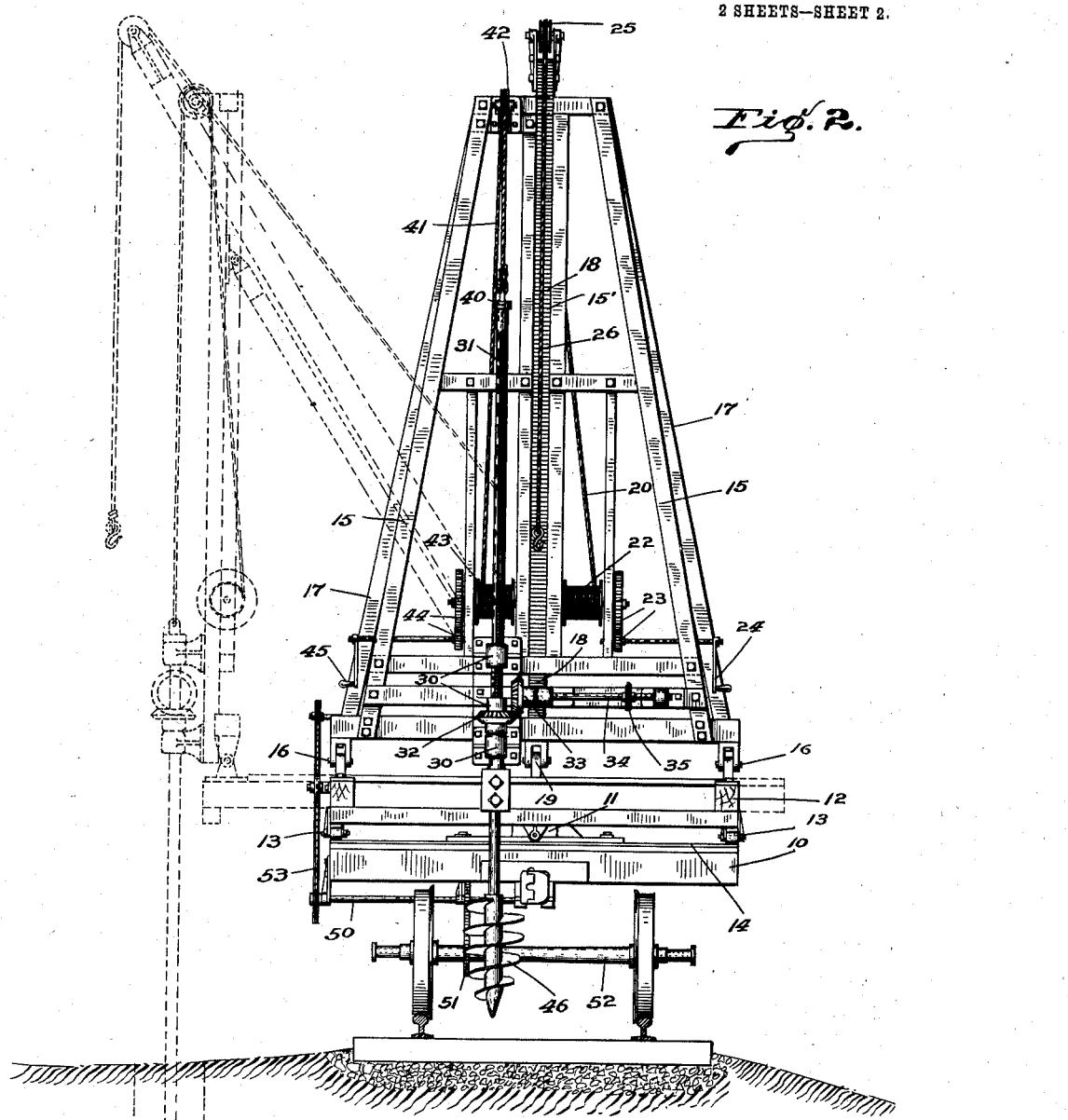

DAVID H. ROBINSON, OF INDIANAPOLIS, INDIANA.

POST-HOLE DIGGER AND POLE-SETTER.

No. 846,622.   Specification of Letters Patent.   Patented March 12, 1907.

Application filed April 21, 1906. Serial No. 312,949.

*To all whom it may concern:*

Be it known that I, DAVID H. ROBINSON, a citizen of the United States, residing at Indianapolis, in the county of Marion and State of Indiana, have invented certain new and useful Improvements in Pole-Hole Diggers and Pole-Setters, of which the following is a specification.

The object of my invention is to produce a vehicle by means of which poles—such as telegraph-poles, trolley-wire poles, and the like—may be easily and quickly installed, the vehicle carrying the necessary power-driven hole-digging apparatus and lifting mechanism.

The accompanying drawings illustrate my invention as applied to a vehicle capable of traversing a railroad.

Figure 1 is a side elevation with the digging and lifting apparatus swung around in line with the line of travel; Fig. 2, an end elevation thereof; Fig. 3, a detail of the support for the derrick-boom; and Fig. 4, a plan, on a smaller scale, of the engine and associated driving parts.

In the drawings, 10 indicates the main platform of a vehicle, which may be a flat-car, as illustrated in the drawings, or any other suitable vehicle. Mounted upon the platform 10 is a central vertical pivot 11, upon which is pivoted a turn-table 12, said turn-table being provided with suitable supporting-wheels 13, adapted to traverse a circular track 14, mounted upon the platform concentric with the pivot 11.

Erected at one end of the turn-table 12 is a frame 15, which is preferably connected to the turn-table 12 by horizontal pivotal connections 16 in order that it may be folded down upon the turn-table for transportation. Frame 15 is held in its upright position by one or more struts 17, detachably connected to the turn-table 12 and the frame 15. Frame 15 is formed with a central vertical guideway 15', through which is projected the swinging boom 18, the lower end of said boom being pivoted at 19 upon the turn-table 12. The outer upper end of boom 18 is held at any height by means of a cable 20, one end of which is attached to the boom near its upper outer end and passed from thence over a pulley 21, carried by the upper end of frame 15, said cable passing from thence downward and attached to a drum 22, journaled on frame 15 and provided with suitable operating-gearing 23, which may be driven by a hand-crank 24. The outer end of boom 18 carries a pulley 25, over which passes a cable 26, which may be attached to the poles or other articles to be lifted. The inner end of cable 26 is secured to a winding-drum 27, of any approved type, mounted upon the turn-table 12 and driven by a suitable motor or engine 28.

Secured to frame 15 are bearings 30, in which is mounted a shaft 31, which shaft is both rotatable and axially movable in the bearings 30. Splined upon shaft 31 between two of the bearings 30 is a gear 32, by means of which said shaft may be driven. Meshing with gear 32 is a gear 33, carried by a shaft 34, which shaft is provided with a sprocket-wheel 35, over which runs a sprocket-chain 36, which also runs over a sprocket-wheel 37, carried by a shaft 38, which may be driven from the motor 28. Shaft 31 is provided at its upper end with a head 40, which is rotatable upon the shaft, and secured to this head is one end of a cable 41, which cable is supported by a wheel 42, journaled at the upper end of frame 15. Cable 41 passes downward to a winding-drum 43, mounted on the frame 15 and provided with a driving-train 44, which may be operated by the crank 45. Shaft 31 carries a hole-boring auger 46 or other suitable hole-digging tool.

In order that the device may be self-propelling, I provide a jack-shaft 50, which is connected by chain 51 with one of the axles 52. The jack-shaft 50 is also connected by a chain 53 with the shaft 38, which carries the winding-drum, chain 53 being withdrawn whenever the apparatus is in use as a hole-boring and pole-lifting mechanism. The motor may be caused to drive the drum 27, the shaft 38, or the shaft 34 by a suitable system of clutches in a well-known manner, as shown in Fig. 4.

For transportation the turn-table 12 will be swung around to the position shown in full lines in Figs. 1 and 2, and, if desired, the frame 15 may be folded down and the boom 18 lowered. When it is desired to produce a post-hole, the turn-table 12 will be swung around to the position indicated in dotted lines in Fig. 2, (or to the opposite side,) so that shaft 31 will lie vertically above the point at which the hole is to be produced. Cable 41 will then be slackened, so that the shaft 31 will be free to move down through the bearings 30 and the boring-tool 46 come into engagement with the ground. Shaft 31 will be then rotated and the boring-tool will enter the ground, as indicated in the dotted lines in Fig. 2. When the bore has reached its required depth, the boring-tool will be withdrawn by means of windlass 42. The pole to be placed in the ground will then be engaged by the cable 26, lifted, and deposited in the hole.

I claim as my invention—

1. The combination, with a vehicle, of a turn-table mounted thereon and having a portion which may be projected beyond the side of the vehicle, a boring-shaft mounted in suitable bearings on said portion of the turn-table and vertically movable therethrough, a hole-forming tool carried by said shaft, means for lifting said shaft, and means for driving the shaft.

2. The combination, with a vehicle, of a turn-table mounted thereon and having a portion which may be projected beyond the side of the vehicle, a boring-shaft mounted in suitable bearings on said portion of the turn-table and vertically movable therethrough, a hole-forming tool carried by said shaft, means for lifting said shaft, means for driving the shaft, and a lifting-derrick also carried by said turn-table.

3. The combination, with a vehicle, of a hole-forming tool carried thereby, means for supporting said hole-forming tool at either side of the vehicle, and means for vertically adjusting said tool.

4. The combination, with a vehicle, of a hole-forming tool carried thereby, means for supporting said hole-forming tool at either side of the vehicle, means for vertically adjusting said tool, and lifting mechanism also carried by said vehicle.

5. The combination, with a vehicle, of a turn-table mounted thereon, a boring-shaft vertically adjustable on said turn-table, a hole-forming tool carried by said shaft, means for rotating said shaft, a boom pivoted upon said turn-table, means for raising and lowering said boom, and lifting mechanism consisting in part of a cable supported by said boom.

In witness whereof I have hereunto set my hand and seal, at Indianapolis, Indiana, this 18th day of April, A. D. 1906.

DAVID H. ROBINSON. [L. S.]

Witnesses:
ARTHUR M. HOOD,
JAMES A. WALSH.